(12) United States Patent
Sarnowski et al.

(10) Patent No.: US 9,371,112 B2
(45) Date of Patent: Jun. 21, 2016

(54) THRU-HULL FITTING AND MANUFACTURING METHOD

(71) Applicant: GEM Products, Inc., Orange Park, FL (US)

(72) Inventors: Jason Sarnowski, Jacksonville, FL (US); Erle Matthew Bridgewater, St. Johns, FL (US)

(73) Assignee: GEM PRODUCTS, INC., Orange Park, FL (US)

( * ) Notice: Subject to any disclaimer, the term of this patent is extended or adjusted under 35 U.S.C. 154(b) by 768 days.

(21) Appl. No.: 13/630,713

(22) Filed: Sep. 28, 2012

(65) Prior Publication Data

US 2014/0090589 A1    Apr. 3, 2014

(51) Int. Cl.
*B63B 13/02* (2006.01)
*F16K 31/122* (2006.01)

(52) U.S. Cl.
CPC ............... *B63B 13/02* (2013.01); *F16K 31/122* (2013.01); *Y10T 29/49826* (2015.01); *Y10T 29/49996* (2015.01)

(58) Field of Classification Search
CPC ............... Y10T 29/49423; Y10T 29/49416; Y10T 29/49412; Y10T 29/4928; Y10T 29/4941; B63B 13/02; F16K 31/122

USPC ............ 114/197, 198, 182; 251/153, 74, 337; 72/370.11, 370.23, 370.26; 285/139.1, 285/139.3, 39; 29/890.12–890.14
See application file for complete search history.

(56) References Cited

U.S. PATENT DOCUMENTS

| | | | | |
|---|---|---|---|---|
| 2,997,975 A * | 8/1961 | Moeller | ............... | B63B 13/00 114/183 R |
| 3,394,671 A * | 7/1968 | Mayer | ............... | B63B 13/00 114/183 R |
| 6,164,231 A * | 12/2000 | Shimmell | ............... | B63B 13/02 114/182 |
| 2002/0129636 A1* | 9/2002 | Kimura | ............... | B21D 7/066 72/369 |
| 2003/0221474 A1* | 12/2003 | Sorgi | ............... | B21K 21/12 72/370.11 |
| 2010/0294186 A1* | 11/2010 | Tung | ............... | B63J 4/006 114/182 |

\* cited by examiner

*Primary Examiner* — Andrew Polay
(74) *Attorney, Agent, or Firm* — Seyfarth Shaw LLP

(57) ABSTRACT

A method of manufacturing a marine thru-hull fitting from a single stock material to fit a variety of different sized boat hulls is disclosed. A variety of differently-sized thru-hulls can therefore be formed from the same stock item, reducing the amount of inventory manufacturers are required to maintain.

16 Claims, 3 Drawing Sheets

US 9,371,112 B2

THRU-HULL FITTING AND MANUFACTURING METHOD

TECHNICAL FIELD OF THE INVENTION

The present application relates to method of manufacturing a thru-hull fitting. Particularly, the present application relates to a method of manufacturing a versatile thru-hull fitting from a stock material.

BACKGROUND OF THE INVENTION

Inventory control is particularly challenging to manufacturers in the boating industry and marine parts suppliers because boats are produced in a variety of boat designs and configurations. Unlike the automotive industry, for example, in which comparatively few designs are used to produce a very large number of automobiles, in the boat production industry most boat designs are used to produce relatively few boats. Marine parts suppliers must maintain a vast inventory of parts in a variety of sizes and configurations to fit the different boat designs. Storing boat parts can require a large warehouse or storage facility to accommodate not only the different parts, but the different sizes of each part.

Thru-hull fittings, sometimes referred to as "thru-hulls," are an example of a marine part used in most boat designs to provide a drain hole or intake hole through the hull. Thru-hulls generally include a tube attached to a mushroom shaped head on the outboard end of the tube and a threaded portion on the inboard end for attachment to a shut-off valve inside of the hull. Thru-hulls are made in a large variety of sizes and configurations to fit the variety of boat designs. Conventional thru-hulls are cast and therefore require a mold for each part.

SUMMARY OF THE INVENTION

The present application discloses a method of manufacturing a thru-hull to fit a variety of different boat hulls without casting and without requiring a custom sized stock material from which the thru-hull is manufactured. Rather, several differently sized thru-hulls can be manufactured from a single stock material. The method according to the present application therefore reduces the number of stock materials the manufacturer is required to maintain in inventory.

In particular, the present application discloses a method of manufacturing a thru-hull fitting including selecting a pipe having first and second axial ends and an outer pipe diameter extending in a radial direction, flaring the first axial end to form a flare having an outer flare diameter, cutting the second end of the pipe to reduce a length of the pipe, pressing a first area of the pipe in the radial direction to form a first flat, and forming a thread in at least a portion of the pipe.

Also disclosed is a marine thru-hull fitting including a pipe having first and second axial ends and an outer pipe diameter extending in a radial direction and a pipe wall thickness, a flare having an outer flare diameter formed on the first axial end of the pipe, the flare including non-tapered edge, the non-tapered edge corresponding to a displaced portion of the pipe wall thickness, a first flat formed on a first area of the pipe, a first area of the pipe in the radial direction to form a first flat, and a thread formed in at least a portion of the pipe.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

Figure 1:
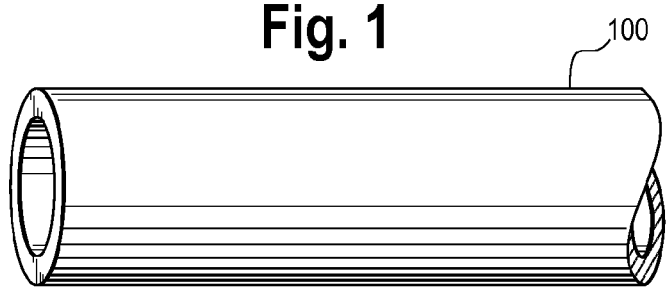
FIG. 1 is a side perspective view of a typical thru-hull stock material to be used in accordance with a method according to the present application.

It should be understood that the comments included in the notes as well as the materials, dimensions and tolerances discussed therein are simply proposals such that one skilled in the art would be able to modify the proposals within the scope of the present application.

DETAILED DESCRIPTION OF THE EMBODIMENTS

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated.

The present application discloses a method of manufacturing a thru-hull from a single stock material that can be cut and formed to fit a variety of differently sized boat hulls. A variety of differently-sized thru-hulls can therefore be formed from the same stock item, reducing the amount of inventory manufacturers are required to maintain.

As shown in FIG. 1, a thru-hull 10 can include first and second axial ends disposed on opposing axial ends of a pipe 100. The pipe 100 has an inner pipe diameter and outer pipe diameter designating the inner-most and outer-most radial dimensions of the pipe 100. Although not shown in FIG. 1, the pipe 100 can be provided with threads, or as a smooth pipe to be threaded later. Accordingly, a pipe 100 can be provided as a first step of manufacturing the thru-hull 10.

Figure 2:
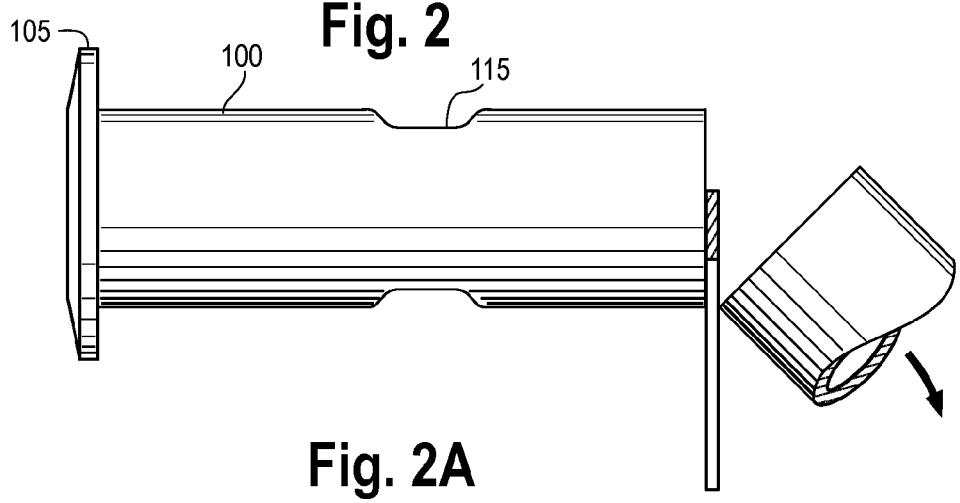
FIG. 2 is a side view of a thru-hull with a flare having been formed on one end of the thru-hull in accordance with a method according to the present application.
Figure 2A:
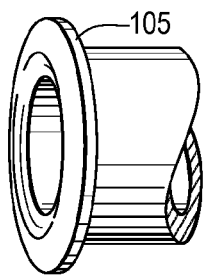
FIG. 2A is a side perspective view of the thru-hull illustrated in FIG. 2.

A flare 105 is formed, as shown in FIG. 2 and FIG. 2A by applying stress is to an end of the pipe 100 that exceeds the yield strength of the pipe 100. The applied stress causes plastic deformation in the pipe 100 until the flare 105 is formed. The flare 105 can be produced by way of a hydraulic press or any other suitable means such that the flare 105 includes an outer flare diameter larger than the pipe outer diameter. In an embodiment, the flare 105 can be heated prior to or during the flaring operating to reduce the stress required to create the flare 105.

When installed on a boat, the flare 105 is configured to be positioned adjacent the external surface of the hull. The flare prevents the thru-hull 10 from being pulled inside the hull. A corresponding nut (not shown) can be threadably engaged with the pipe 100 on the inside of the hull to secure the flare 105 against the external surface of the hull. Although not required, the flare 105 can be positioned adjacent the external surface in a substantially flush manner.

Rather than requiring a specific mold to cast a specific length part, a stock pipe 100 can be cut to fit the required length of the thru-hull 10. As shown in FIG. 2, in certain embodiments, the pipe 100 is cut to length at a cut line 110 proximate one of the first and second axial ends to reduce the axial length of the pipe 100. Using a versatile stock pipe 100 to produce different thru-hull lengths in this manner avoids the hassle and expense of inventory control. As discussed below, the pipe 100 can be cut at the cut line 110 before or after the flare 105 is formed without departing from the spirit and scope of the present application.

In certain embodiments, the pipe 100 is radially pressed to form one or more flats 115. The flats 115 provide a gripping portion for a wrench or other tool so the thru-hull 10 can be held while a nut, valve or other fitting is threaded onto the thru-hull 10. The flats 115 are not limited in size or shape, and can cover any radial or axial portion of the pipe 100 without departing from the spirit and scope of the present application. In an embodiment, two flats 115 are created on the pipe 100. However, any number of flats 115 can be pressed into the pipe 100 without departing from the spirit and scope of the present application. In an embodiment, the flats 115 are pressed into the pipe 100 substantially simultaneously. However, the flats 115 can be pressed into the pipe 100 independent of one another, or the thru-hull can be manufactured without any flats 115 pressed into the pipe 100.

Figure 3:
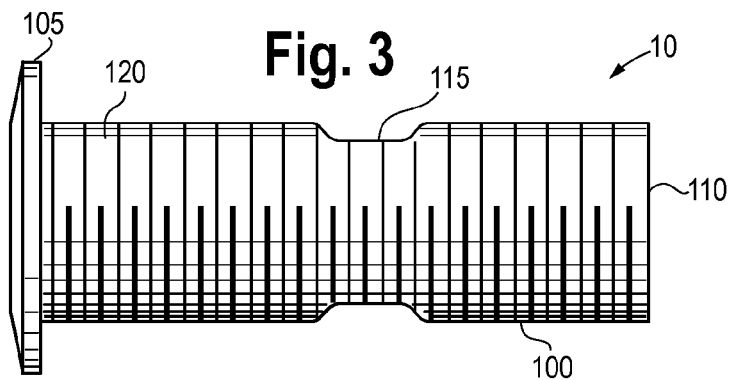
FIG. 3 is a side view of a thru-hull after threads have been formed in the thru-hull in accordance with a method according to the present application.

In certain embodiments, threads 120 are formed in the pipe 100, as shown in FIG. 3. The threads 120 are shown as extending along the entire axial length of the pipe 100, but the threads 120 can extend along any portion of the pipe 100 without departing from the spirit and scope of the present application.

Although a method of manufacturing a thru-hull is described above as occurring in a particular order based on what is illustrated in FIGS. 1-3, persons having ordinary skill in the art should understand that the manufacturing methods described herein can be implemented in a different order without departing from the spirit and scope of the present application. For example, the step of threading the pipe 100 to form threads 120 can be performed after the pipe 100 is selected, and the step of cutting the pipe 100 along the cut line 110 can be performed after or before the flare 105 is formed.

Figure 4:
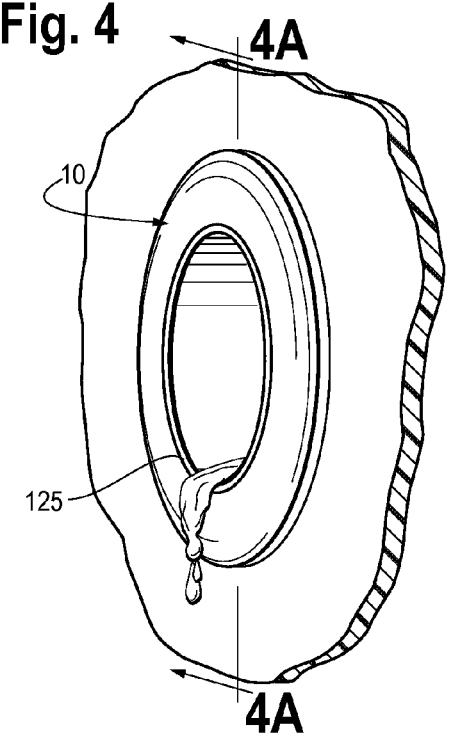
FIG. 4 is a side perspective view of a thru-hull assembled into a boat hull in accordance with an embodiment of the present application.
Figure 4A:
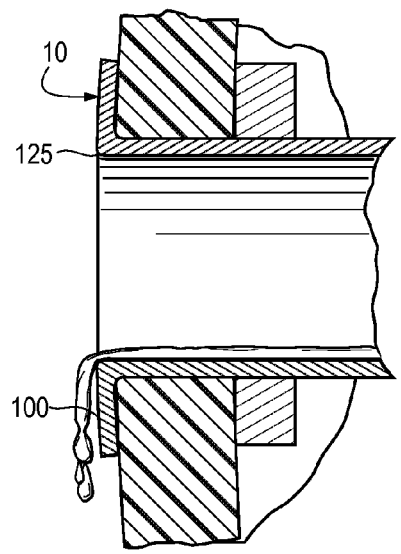
FIG. 4A is a side sectional view of the thru-hull illustrated in FIG. 4.

A conventional thru-hull 10 can include a rounded edge on the flare 105, such that water flowing out of the thru-hull 10 will "hug" the edge and drip along the flange 105 and along the surface of the boat to which the thru-hull 10 is attached. This system causes water to drip down the side of the boat and cause unsightly marks. Such staining can cause aesthetic problems with the boat and damage the boat surface. As shown in FIGS. 4 and 4A, water will not "hug" the edge of the thru-hull 10 if the edge has a more angled shape. With the more angled shaped edge, water will flow out of the thru-hull 10 and drip from the angled edge, rather than "hug" a rounded edge. The difference between a rounded and angled edge can be subtle, and many thru-hulls are manufactured without this problem taken into consideration.

Figure 5:
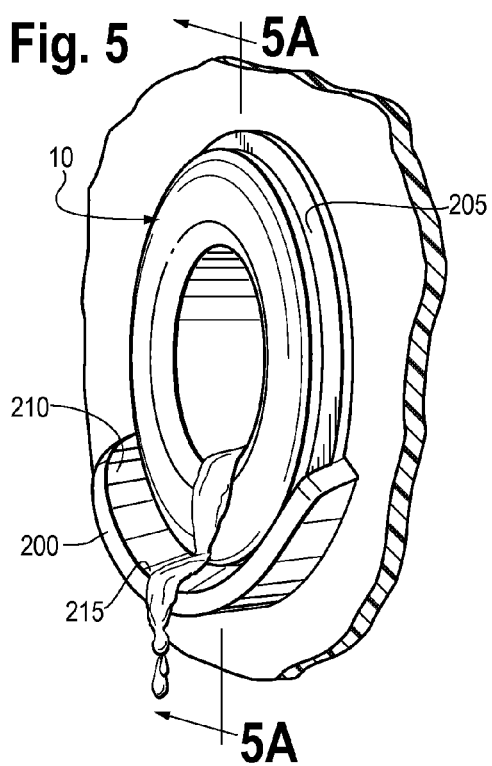
FIG. 5 is a side perspective view of a thru-hull with drip attachment in accordance with an embodiment of the present application.
Figure 5A:
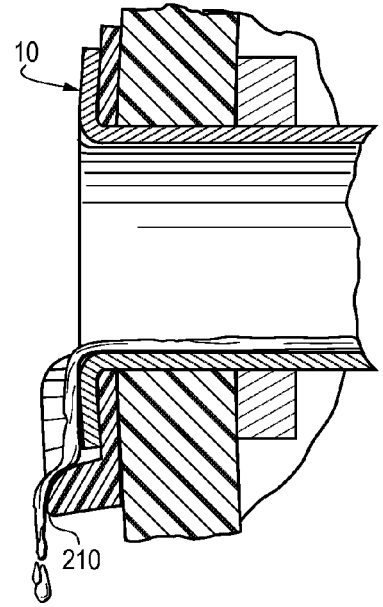
FIG. 5A is a side sectional view of the thru-hull illustrated in FIG. 5.

Certain embodiments of the present application can also include installing an bushing 200, as shown in FIGS. 4-5A. The bushing 200 is attached to the thru-hull 10 to ensure that water draining from the thru-hull does not cling to the external surface of the hull. As shown in FIG. 5, in one embodiment, the bushing 200 includes a ring 205 that can fit around the thru-hull 10. As shown, the ring 205 includes an inner ring diameter and an outer ring diameter. The inner ring diameter is larger than the outer pipe diameter of the thru-hull. The bushing 200 can be disposed between the flare 105 and the surface on which the thru-hull is installed when in use.

The bushing 200 can also include an annular protrusion 210 that guides water exiting the thru-hull 10. As shown in FIG. 5, the annular protrusion 210 is positioned below the flare 105 in a gravitational direction. That is, the annular protrusion 210 can be disposed in a direction relative to the thru-hull 10 such that water will fall onto the annular protrusion 210 and flow off an edge 215 of the annular protrusion 210 based on the force of gravity. The edge 215 can be rounded or angled.

The ring 205 includes an outer ring diameter that is larger than the outer flare diameter. Accordingly, the ring 205 can include a structure similar to a washer so as to act as a base upon which the thru-hull 10 can rest when installed on the surface of a boat. The ring 205 can also have an outer diameter smaller than the outer diameter of the thru-hull 10 without departing from the spirit and scope of the present application.

As shown, the annular protrusion 210 can extend along at least a portion of the outer pipe diameter of the thru-hull. That is, the annular protrusion 210 can be arcuately shaped and can have an inner radial portion that is substantially flush with the outer pipe diameter of the thru-hull. This configuration allows the annular protrusion 210 to receive water directly from the thru-hull 10 and guide the water away from the surface of the boat to avoid staining the hull.

By including the bushing 200 to direct water away from the hull, manufacturers can provide thru-hulls with either rounded or angled corners of the flare portion. Without the bushing, rounded or angled corners of the flare portion could cause fluids drain along the hull. Installation of the bushing according to embodiments of the present disclosure can eliminate the cost of additional manufacturing steps to taper the flare, for example.

Figure 7:
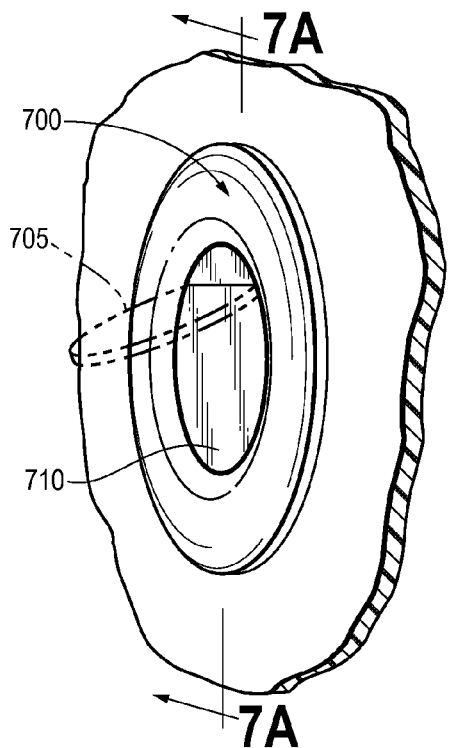
FIG. 7 is a side perspective view of a prior art thru-hull.

Many thru-hulls include a flap to form a one-way valve, sometimes referred to as a "check valve," that allows water to flow out from the hull and resists the flow of water into the hull. FIG. 7 shows a thru-hull 700 including a flap 705 that is pivotably secured to the thru-hull 700 by means of a screw or fastener, for example. The flap 705 rests on the end of the thru-hull 700 and is sized to fit the thru-hull. To function properly, the flap 705 is sized to fit the end of the thru-hull 700. Because different sized thru-hulls use different sized flaps, manufacturers incur the expense of maintain inventories of different sized flaps. Such a configuration is also disadvantageous because it requires precise measurements and tolerances that are expensive or impractical in boat part manufacturing, for example.

Figure 7A:
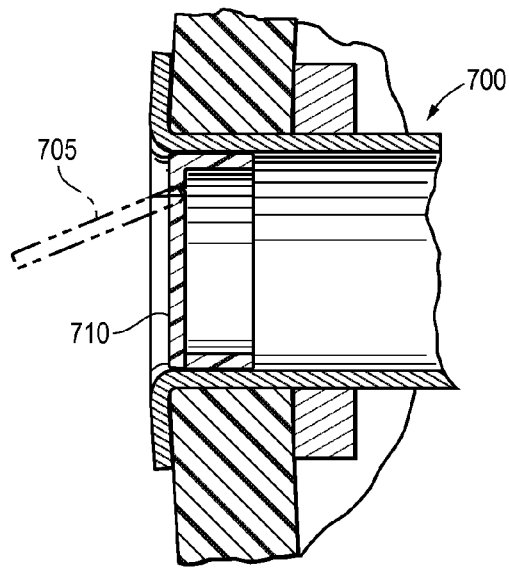
FIG. 7A is a side sectional view of the thru-hull illustrated in FIG. 7.

Embodiments of the present disclosure include a check valve that is configured on the inboard end of a through-hull. This type of check valve is used instead of relying on a flap installed on the thru-hull as in FIGS. 7 and 7A, for example. According to embodiments of the present disclosure, one size internal check valve can be installed on thru-hulls having a variety of lengths, so a smaller variety of check valves can be maintained in inventory.

Figure 6:
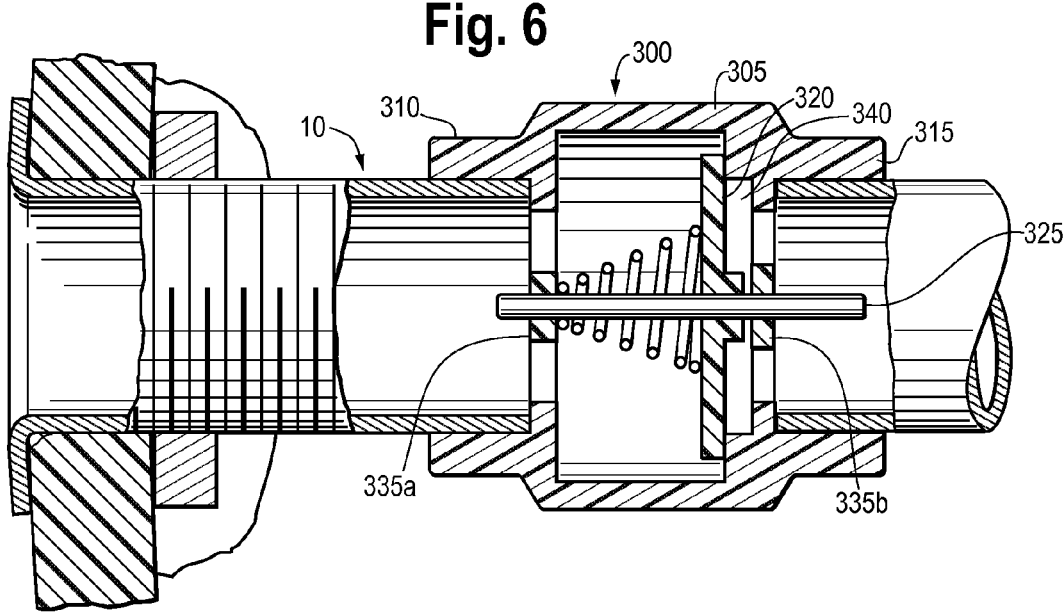
FIG. 6 is a side sectional view of a thru-hull with filter attachment in accordance with an embodiment of the present application.

Referring to FIG. 6, the method according to embodiments of the present application includes threading a valve 300 onto the thru-hull 10. The valve 300 includes a body 305 with a first body end 310 and a second body end 315 opposite the first body end 310. The valve 300 also includes a plug 320 that is movably coupled to a shaft 325 and elastically biased into a closed position by a spring 330. A first guide 335a movably couples the shaft 325 proximate the first end 310 and a second guide 335b movably couples the shaft 325 proximate the second end 315. The body can also include a valve seat 340, either integrally with or separate from the body 305, and upon which the plug 320 rests when in the closed position.

The body 305 can include threads at the first 310 and second 315 ends to couple with corresponding threads of other components of a boating or piping system, such as a thru-hull 10. Accordingly, the valve 300 can prevent water from entering the boat through the thru-hull 10 without requiring the complex structure and precise measurements of the conventional valve 700.

The body 305 can include a body inner diameter and a body outer diameter to define the inner and outer most radial dimensions of the body 305. Accordingly, the body 305 can extend along an axial direction in a length defined by the distance between the first 310 and second 315 body ends.

The shaft 325 can be coupled to the first 335a and second 335b guides and can move axially within the body 305 under the bias of the spring 330. That is, the spring 330 can bias the shaft 325 and plug 320 in the closed position, where the plug 320 rests against the valve seat 340 and prevents water from flowing through the first end 310 and out of the second end 315, into the hull of the boat. The shaft 325, however, is not limited to only axially moving, and can move in any direction that facilitates a one-directional valve movement of the plug 320.

As shown, the plug 320 is elastically biased by the spring 330. However, any structure that elastically biases the plug 320 into the closed position, where water is prevented from flowing into the hull, can be implemented without departing from the spirit and scope of the present application.

The plug 320 can be circularly shaped and can have a plug diameter that is adapted to substantially carry a flow of liquid when the plug diameter is radially aligned with the body inner diameter. In other words, the plug diameter can be shaped to cover an opening upon which the plug diameter rests. The plug diameter need not be the same as the inner body diameter.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A method of manufacturing a thru-hull fitting comprising:
    flaring a first axial end of a pipe to form a flare having an outer flare diameter;
    pressing a first area of the pipe in a radial direction relative to the pipe to form a first flat;
    forming a thread in at least a portion of the pipe; and
    threadably coupling a one-way valve to a second axial end of the pipe, wherein the one-way valve comprises:
        a body having first and second body ends and body inner and outer diameters extending in the radial direction;
        first and second guides disposed within the body;
        a shaft adapted to be movably coupled to the first and second guides; and
        a plug having a plug diameter adapted to substantially impair a flow of liquid when the plug diameter is radially aligned with the body inner diameter, thereby establishing a closed position, the plug being coupled to the shaft and biased toward the closed position.

2. The method of claim 1 further comprising pressing a second area of the pipe in the radial direction to form a second flat.

3. The method of claim 2, wherein the steps of pressing the first and second areas are performed substantially simultaneously.

4. The method of claim 1, wherein the step of flaring the first axial end of the pipe causes the outer flare diameter to be greater than an outer diameter of the pipe.

5. The method of claim 1, wherein the step of flaring the first axial end is performed with a hydraulic press.

6. The method of claim 1, further comprising configuring a bushing to dispense liquids exiting the thru-hull fitting in a direction away from the thru-hull fitting.

7. The method of claim 6, wherein the bushing includes:
    a ring having inner and outer ring diameters, the inner ring diameter being larger than an outer diameter of the pipe, and the ring being adapted to be disposed between the flare and a surface upon which the thru-hull fitting is installed; and
    an annular protrusion adapted to extend from the ring away from the surface and beyond the first axial end of the thru-hull fitting when the bushing is disposed on the thru-hull fitting such that liquid flowing out of the thru-hull fitting is dispersed through the annular protrusion and away from the surface.

8. The method of claim 7, wherein the annular protrusion includes an edge substantially angled upon which the liquid can flow when the bushing is disposed on the thru-hull fitting.

9. The method of claim 7, wherein the annular protrusion is further adapted to extend along at least a portion of the outer diameter of the pipe.

10. The method of claim 7, wherein the annular protrusion is adapted to be disposed gravitationally below the flare.

11. The method of claim 1, wherein the first and second guides are integral with the body.

12. The method of claim 1, wherein the shaft is substantially axially aligned with the pipe.

13. The method of claim 1, wherein the plug is biased to the closed position by a spring.

14. The method of claim 1, further comprising a valve seat extending radially inward relative to the body inner diameter and upon which the plug is adapted to abut when disposed in the closed position.

15. The method of claim 1, further comprising first and second threads respectively disposed at the first and second body ends, wherein at least one of the first and second threads is adapted to couple to the second axial end of the thru-hull.

16. The method of claim 1, further comprising cutting a second end of the pipe to reduce a length of the pipe.

* * * * *